United States Patent [19]
Fendt et al.

[11] Patent Number: 5,962,934
[45] Date of Patent: Oct. 5, 1999

[54] ARRANGEMENT FOR ELECTRICAL POWER SUPPLY

[75] Inventors: Günter Fendt; Peter Hora, both of Schrobenhausen, Germany

[73] Assignee: Temic Telefunken microelectronic GmbH, Heilbronn, Germany

[21] Appl. No.: 08/946,354

[22] Filed: Oct. 7, 1997

[30] Foreign Application Priority Data

Oct. 18, 1996 [DE] Germany ............................ 196 43 014

[51] Int. Cl.$^6$ .................................................... G01R 31/02
[52] U.S. Cl. ........................ 307/126; 324/500; 324/522; 324/527; 324/537; 324/771; 361/65
[58] Field of Search ................................ 307/126, 64, 66, 307/44; 324/500, 537, 522, 527, 771; 379/26; 361/65; 363/79

[56] References Cited

U.S. PATENT DOCUMENTS

| | | |
|---|---|---|
| 4,357,574 | 11/1982 | Takamisawa et al. .................. 324/771 |
| 4,482,815 | 11/1984 | Orengo ....................................... 307/44 |
| 4,528,427 | 7/1985 | Gadonna et al. .......................... 379/26 |
| 5,063,471 | 11/1991 | Park . |
| 5,142,235 | 8/1992 | Matsumoto et al. ..................... 324/537 |
| 5,345,180 | 9/1994 | Maier et al. .............................. 324/500 |

*Primary Examiner*—Albert W. Paladini
*Attorney, Agent, or Firm*—Venable; Norman N. Kunitz

[57] ABSTRACT

An arrangement for supplying electrical power to at least one load arranged along a power supply line, preferably in motor vehicles, is characterized by having a power supply facility that has at least one input for a supply voltage and at least one output for the supply voltage and a testing device, by the testing device being designed to test an output for the supply voltage to establish whether a short-circuit, i.e. a resistance of too low a value, exists at this output, and by the power supply facility having a switching device and being designed in such a way that a supply voltage fed to it is switched through by the switching device to the output tested by the testing device only when the test has established the non-existence of a short-circuit. This allows the power supply to be maintained if a single fault occurs.

11 Claims, 2 Drawing Sheets ary of the invention is to provide a means of

ARRANGEMENT FOR ELECTRICAL POWER SUPPLY

BACKGROUND OF THE INVENTION

The invention relates to an arrangement for supplying electrical power to at least one load arranged along a power supply line, preferably in motor vehicles. Arrangements of this kind are known where an electric line with a voltage of, for example, +12 V is taken to numerous loads (e.g. electrical motors or other devices) each of which is connected with one pole to the electric line and additionally to frame or ground (negative pole of the power supply). If a low-ohmic resistance or a short-circuit occurs in the 12 V line to frame or ground, all loads are no longer in an operable state and it is possible for the vehicle battery to discharge as a result of drawing too much current.

SUMMARY OF THE INVENTION

The object of the invention is to provide a means of avoiding or reducing these disadvantages. This object is accomplished in that the arrangement has a power supply facility (central unit, module) having at least one input for a supply voltage and at least one output for the supply voltage and a testing device, in that the testing device is designed to test an output for the supply voltage to establish whether there is a short-circuit at this output, that is, whether a resistance of too low a value is connected to this output, and in that the power supply facility has a switching device designed in such a way that a supply voltage fed to the power supply facility switches through by means of the switching device to the output tested by the testing device when the test establishes that there is no short-circuit. The invention also includes a bus system.

The invention is suitable for use where there are numerous output stages (electronic units), e.g., for airbag control devices, that cannot be accommodated in a single housing at a central location, and allows the output stages, in particular those for igniting a gas generator or belt tightener, to be arranged decentrally and to be supplied sequentially with electrical operating power. At a central location there is then only, for example, the signal processing system for evaluating the crash signals and the interfaces to the various distributed units along with the power supply unit for the general supply of electrical power.

The invention makes it possible for a bus electrical power supply concept to be realized in an advantageous way in a system of ring-shaped design where, if single faults occur (e.g., a single short-circuit in the power supply bus or a single interrupt) it is still possible to keep operable the elements to be supplied with electrical power and located between the central unit provided for the supply of electrical power and the point where the fault has occurred. If, as described later in the embodiment example, a ring-shaped bus (or a bus with two ends to each of which electrical power is supplied) is used, and if power supply devices that can be operated in two directions and which are also described later on are used, then all elements connected to a bus can continue to be supplied with electrical power in the event of a single fault occurring on the bus. In systems of star-shaped design, this ensures that, in the event of a short-circuit in the power supply bus or in the event of an interrupt, the entire line does not fail but that the bus system can continue to function up to the point where the fault has occurred.

Further advantages of the invention are that, in order to maintain disturbance-free operation in the event of single faults, no further electrical supply line is necessary in the cable tree connecting the individual components in a motor vehicle. A further advantage is that the capacitors in the individual modules, which over a short period of time still maintain their operability even though the external electrical power supply (automobile battery) might have failed as the result of an accident, can be of smaller dimensions because they can be supplied with a defined voltage from the central unit and do not need to be calculated with the lowest defined supply voltage of the automobile battery. This applies in particular when the voltage fed to the supply unit is kept at, for example, 12 or 20 V independently of the actual battery voltage.

In one embodiment of the invention, the power supply facility or unit is designed in such a way that the supply voltage can be switched through to the output only when the power supply facility has reached a voltage that suffices for its own operation and preferably for the operation of a load connected to it. An advantage here is that in the event of a short-circuit not all loads will necessarily fail.

Advantageously, provision is made for a capacitor to store the supply voltage.

In one embodiment of the invention, a threshold value facility or unit is provided which, when the voltage at the output to which the supply voltage is to be switched through exceeds a predetermined threshold value, causes an electrically controllable switching device connected between the capacitor and the output to become conductive. The supply voltage is thus simply prevented from being connected to another point in the circuit in the event of a short-circuit.

In one embodiment of the invention, the testing device has a current source connected to the terminal to which the supply voltage is to be switched through. This is a simple and reliable means of testing for a short-circuit.

In one embodiment of the invention, a threshold value facility or unit is provided that activates the current source at the output when the voltage at the capacitor exceeds a predetermined threshold value. This ensures that the module is in an operable state before the supply voltage is switched forward.

One embodiment of the invention is characterized by a symmetrical construction with duplication of all components except for the capacitor which can be provided once only, the arrangement being designed such that two terminals can be operated, either as input on the one side and as output on the other or as output on the one side and as input on the other, depending on the supply voltage provided. This enables the supply voltage to be switched through in two directions.

One embodiment of the invention concerns a bus system for the electrical power supply to numerous loads, characterized by a power supply facility of the type described above as central unit for the power supply to numerous loads and/or as module for the power supply to a load and, where applicable, to downstream modules. A bus system of this kind can be used in a variety of applications.

Further features and advantages of the invention are described below in the embodiment examples of the invention, with reference to the drawing showing the main details in accordance with the invention, and also in the claims. The various features can be realized individually or collectively in any combination in one embodiment of the invention.

DESCRIPTION OF THE PREFERRED EMBODIMENTS

Figure 1:
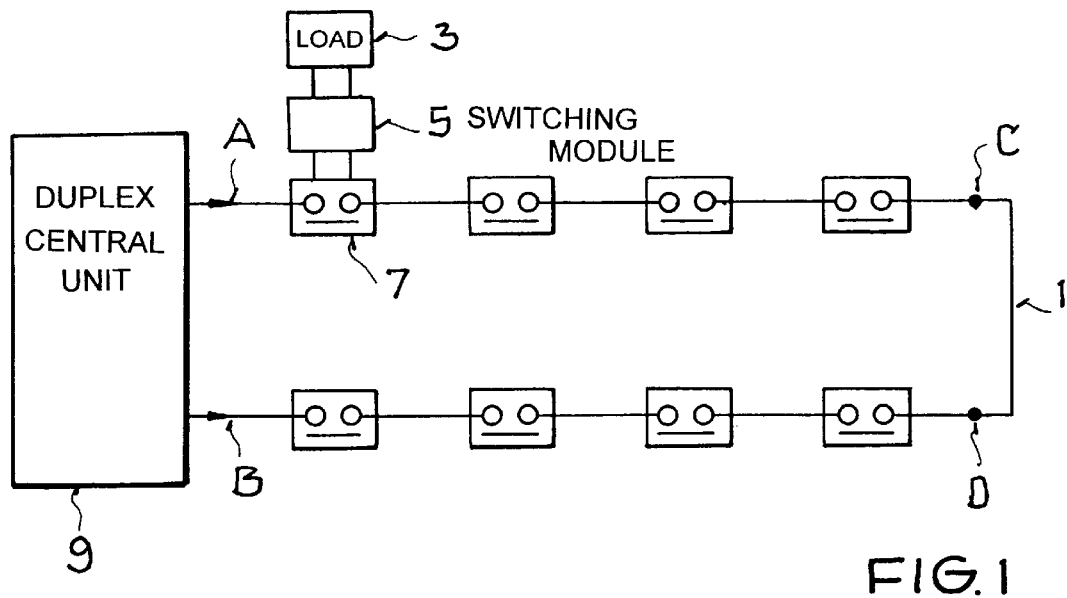
FIG. 1 is a block diagram of an arrangement with a ring-shaped bus system for the power supply.

The bus 1 shown in FIG. 1 is used to supply numerous electrical loads 3 (eight in the example) which are each connected to the bus 1 through a module 5 which provides the electrical power supply (hereinafter also referred to simply as power supply). For this purpose, bus 1 has a number of plug-and-socket devices 7 which are so designed that they electrically connect a plugged-in module 5 to the bus 1 and that when a module 5 is not plugged in the respective plug-and-socket device 7 is short-circuited internally or by means of a short-circuit connector and thereby establishes the connection to the next plug-and-socket device. In order to simplify the drawing, only one single module 5 and one single electrical load 3 is shown in FIG. 1. The bus is ring-shaped.

Bus 1 is connected by its two ends to power supply outputs A and B respectively of a duplex-central unit (DCU) 9. The word "duplex" expresses the ability of this central unit to supply two outputs in the same way with operating voltage for loads. The bus shown in FIG. 1 can therefore be connected in a ring. Alternatively, the ring-shaped bus could also be divided into two linear single buses by omitting the connecting line between the points marked with the characters C and D.

The bus 1 in FIG. 1 shows only that line which serves to forward the positive supply voltage. The line for the negative supply voltage is not shown. It can be formed by a separate line and/or through parts of the metallic structure of the vehicle.

Figure 2:
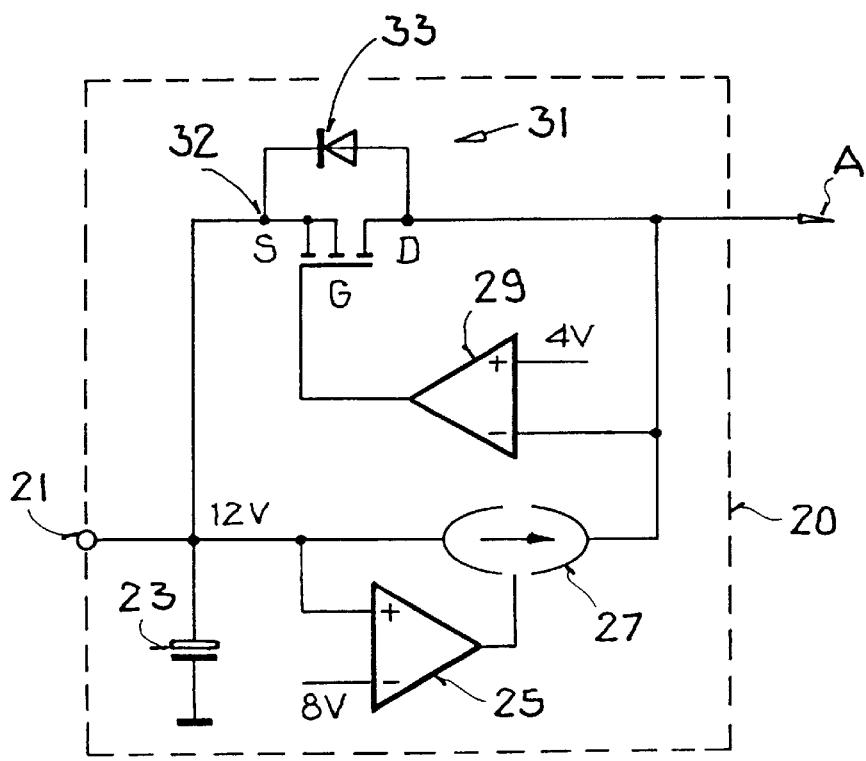
FIG. 2 is an embodiment example of a central unit for feeding a single branch of the power supply bus

FIG. 2 shows a central unit (CU) 20 designed to supply a single branch of a ring-shaped bus or a single linear bus. In order to obtain the duplex-central unit 9 shown in FIG. 1, two central units 20 could be provided, for example, of which one would have to be connected to terminal A and the other to terminal B of FIG. 1.

The central unit 20 has a terminal 21 which is to be supplied with a d.c. voltage of, for example, +12 or +20 V. This can be done expediently by means of a special power supply unit which generates a relatively constant voltage of 12 V from the 12 volt power supply of a motor vehicle that can experience considerable fluctuations upwards and downwards.

The central unit 20 is designed such that after the power supply of, for example, a motor vehicle has been switched on, and after the central unit 20 has reached a stable condition, the voltage of 12 V is not switched through directly to the output A but instead a check is first made to establish whether output A has a terminating resistance which is so low with respect to frame or ground that this is considered to be a short-circuit. If a state of this kind interpreted as a short-circuit exists, the voltage at terminal 21 of, for example, 12 V, is not switched through to terminal A. This prevents an unnecessary amount of power being drawn from the battery. Also, this can prevent possible dangers due to overheating.

In the example, the central unit 20 has a capacitor 23 which is connected between terminal 21 and frame or ground and which in the example has a value of 470 µF. Connected to terminal 21 is the non-inverting terminal of a comparator 25 to the inverting input of which a voltage of +8 V is applied. The output signal of the comparator 25 therefore assumes a high value when the voltage at terminal 21 exceeds a value of +8 V. The output of the comparator 25 is connected to a control input of a current source 27. This is symbolized by an arrow symbol placed between two parabolic lines. The current input of the current source 27 is connected to the terminal 21, the current output of the current source 27 is connected to the terminal A. Also connected to terminal A is the inverting input of another comparator 29 to the non-inverting input of which a positive voltage of +4 V is applied. The output of the other comparator 29 is connected to the control input of an electrically controlled switching device 31 which is also connected on one side to the terminal 21 and on the other side to the terminal A and, provided the current is flowing from terminal 21 to terminal A, establishes or isolates the connection between the aforementioned two terminals according to the value of the voltage supplied to the control input.

In the example, the switching device 31 is realized with a low-resistance semiconductor switch, in particular a transistor, in the example a field-effect transistor (FET) 32, and in the example of FIG. 2 with a p-channel FET.

As already mentioned, the gate connection G of the FET 32 is connected to the output of the comparator 29, the source terminal S is connected to the positive terminal of the capacitor 23 and thus to the terminal 21, and the drain terminal D is connected to the terminal A. In the FET 32, a diode 33 is integrated in the usual way as protective diode that allows current to flow from drain terminal D to source terminal S when FET 32 is in the nonconductive state.

The principle of operation is as follows:

After switching on the power supply, for example of a motor vehicle in which the central unit 20 is installed, the capacitor 23 is charged with a specific time constant. The switching device 31 is blocked for the flow of current from capacitor 23 to terminal A.

As soon as the voltage at the capacitor 23 exceeds the value of 8 V, the current source 27 is switched on via the comparator 25. This feeds a constant current, which in the example has a value of 30 mA, into the lines connected to the terminal A. If the terminal A is not terminated with too low a resistance towards frame or ground, that is if there is no short-circuit, the voltage at the output A reaches a value of +4 V after a certain period of time. Consequently, the voltage at gate G of FET 32 changes from a positive value to a negative value causing FET 32 to become conductive and therefore allowing current to flow from capacitor 23 to output A. In the event of a short-circuit at output A, however, the specified voltage of 4 V would not be reached and FET 32 would not become conductive. The comparators form threshold value devices and, together with current source 27, comparator 29 forms a device for testing output A for the existence of a short-circuit. The current from the current source is considerably less than the current that would flow on switching through the switching device 31 in the event of a short-circuit to terminal A.

Instead of a p-channel FET for the switching device 31, a n-channel FET could be provided in which only the terminals S and D as well as the gate voltage would be interchanged as compared with FIG. 2. The diode that is placed in any case in the n-channel FET for the purpose of protecting the FET is polarized with respect to the current to be fed to terminal A in the same way as in FIG. 1.

In order to form the duplex central unit 9 shown in FIG. 1, it is possible to provide two central units 20 as shown in FIG. 2, both of which are supplied with 12 V and of which one feeds one branch of the power supply bus and the other the other branch of the power supply bus of FIG. 1.

Figure 3:
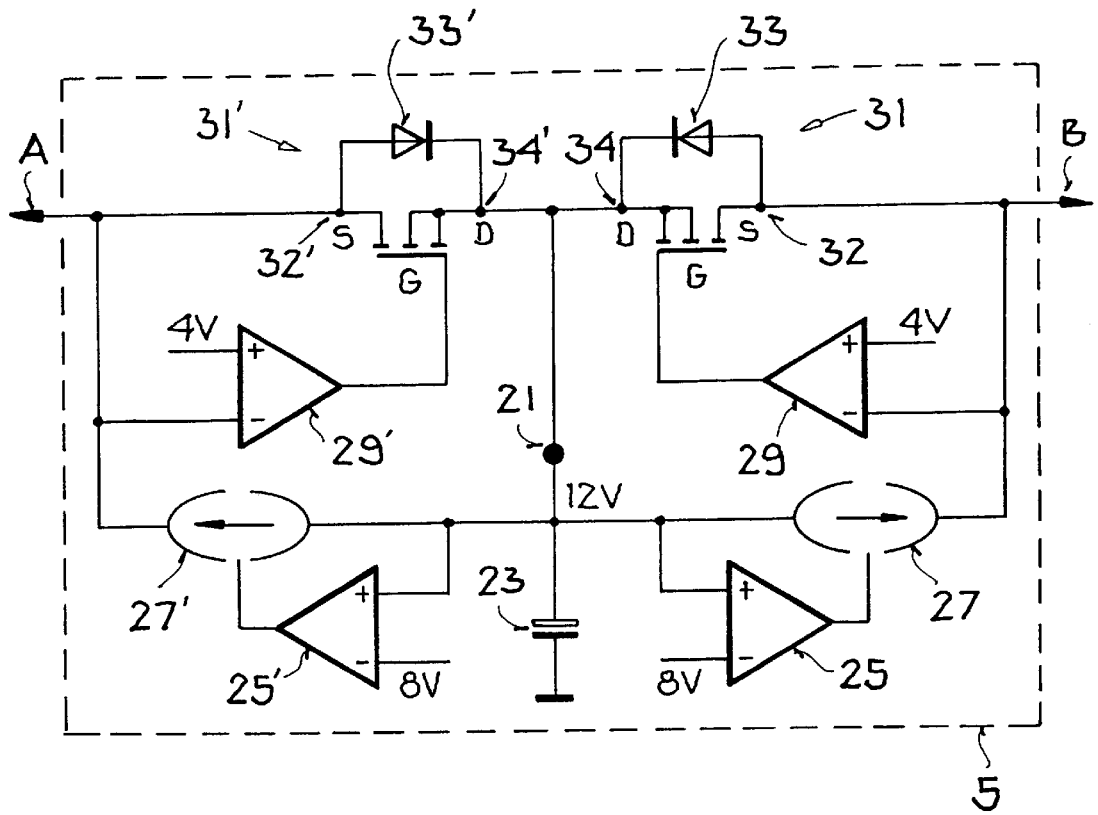
FIG. 3 is an embodiment example of a power supply module which is suitable for use in a ring-shaped power supply bus

The power supply module 5 shown in FIG. 3 has two terminals A and B which are to be interpreted such that terminal A is closer to terminal A of the duplex-central unit 9 in FIG. 1 and that when module 5 cannot be supplied with power from terminal A of the duplex-central unit 9 for whatever reason this power is fed from terminal B of duplex-central unit 9 via bus 1 to terminal B of module 5.

Module 5 has the same components as the central unit 20, namely the capacitor 23 and in the right-hand part of FIG. 3 the remaining elements of FIG. 2, although here an n-channel FET (FET 34) is provided as already described as variant in the description of FIG. 2. It has also been mentioned already that for both kinds of FET in the present circuit the function is fully identical.

In the left-hand part of FIG. 3, module 5 has exactly the same parts again as in the right-hand part in mirror-image form (except for the capacitor 23 which is provided only once) and these parts are marked by an apostrophe. These parts are a comparator 25', a current source 27', another comparator 29' and another electrically controllable switching device 31' with a FET 34' and a diode 33'. Its source terminal S is connected to the terminal A and the source terminal S of the other FET 34 is connected to terminal B. The drain terminals D of the two FETs are connected together and to the positive terminal of the capacitor 23. The components in the left-hand part of FIG. 3 are connected together in the same way as those in the right-hand part.

The mirror-image part of FIG. 3 can be omitted if the power supply is required in one direction only (from A to B), as for example in a system of star-shaped design.

The principle of operation of the arrangement shown in FIG. 3 is as follows: It is assumed first of all that the module 5 in FIG. 3 is the first module connected directly with the terminal A in FIG. 1, and that there are also numerous further modules up to terminal B of the duplex-central unit 9 of FIG. 1. If the arrangement is switched on, the duplex-central unit 9 checks, as already mentioned, to establish whether there is a short-circuit at its terminal A. If there is no short-circuit, terminal A of module 5 (FIG. 3) is supplied with voltage. The FET 34' in the device 31' is blocked, but the diode 33' between source terminals S and D is loaded in the forward direction and is therefore conductive. Current therefore flows from the terminal A into the arrangement of FIG. 3 and charges the capacitor 23. The threshold values of all comparators are initially not reached and the right-hand switching device 31 is not conductive. As already explained with reference to FIG. 2, the arrangement of FIG. 3 supplies a device connected to its terminal B, namely another module 5, with current when there is no short-circuit at terminal B. Since a certain amount of time is required to charge the capacitor 23, not all modules 5, which are connected in series, are put on operating voltage concurrently, but rather sequentially one after the other starting at the terminals A and B of the duplex-central unit 9.

If the voltage at the capacitor exceeds a value of approximately 4 V (depending on the conducting-state voltage of diode 33') the left-hand FET 34' in FIG. 3 is switched via the comparator 29' into the conducting state without the associated current source 27' having to be active. The mode of operation of the circuit shown in FIG. 3 is not changed substantially as a result of this, because current flowed through the diode 33' even before the left-hand FET 34' became conductive. However, through the left-hand FET becoming conductive, the electrical resistance in the current path can possibly be reduced thereby also reducing the electrical losses, which is advantageous. The right-hand FET 34, as already described, becomes conductive when the voltage at the capacitor 23 has exceeded the voltage of 8 V and no short-circuit has been established at the right-hand output B, because then the current source 27 brings the output to a value of more than 4 V.

If the terminal B of the arrangement according to FIG. 3 has a short-circuit or if the connecting line to the next module is interrupted, the following modules can no longer be supplied from the module shown in FIG. 3. They are, however, supplied with electrical power from terminal B of the duplex-central unit 9 of FIG. 1, because this first of all supplies operating voltage to the first module connected to terminal B and then to the downstream modules and finally to the module connected to the right of the module of FIG. 3 from its input B. Because of their completely symmetrical design, the arrangements shown in FIG. 3 are able to forward an operating voltage from the left-hand terminal A to the right-hand terminal B and they are also able to forward an operating voltage from the right-hand terminal B to the left-hand terminal A. The situation can also occur where at just one of the modules a supply voltage is supplied to both terminals A and B from the neighboring modules and that both of these reach the inside of the module. The load fed from the module of FIG. 3 is connected to the capacitor (terminal 21).

In cases where it is certain that a ring-shaped bus will not be used, but instead simply a linear bus fed from one side, it is sufficient to use in place of the symmetrically designed circuit shown in FIG. 3 simply one half of it for a module, namely precisely that circuit shown in FIG. 2, or the right-hand (or left-hand) part of FIG. 3 with the capacitor. Even if not used as central unit, this circuit is able to conduct a voltage provided at its terminal 21 to a load also connected to terminal 21, i.e., at capacitor 23, and to forward this to terminal A provided no short-circuit prevails there.

Figure 4:
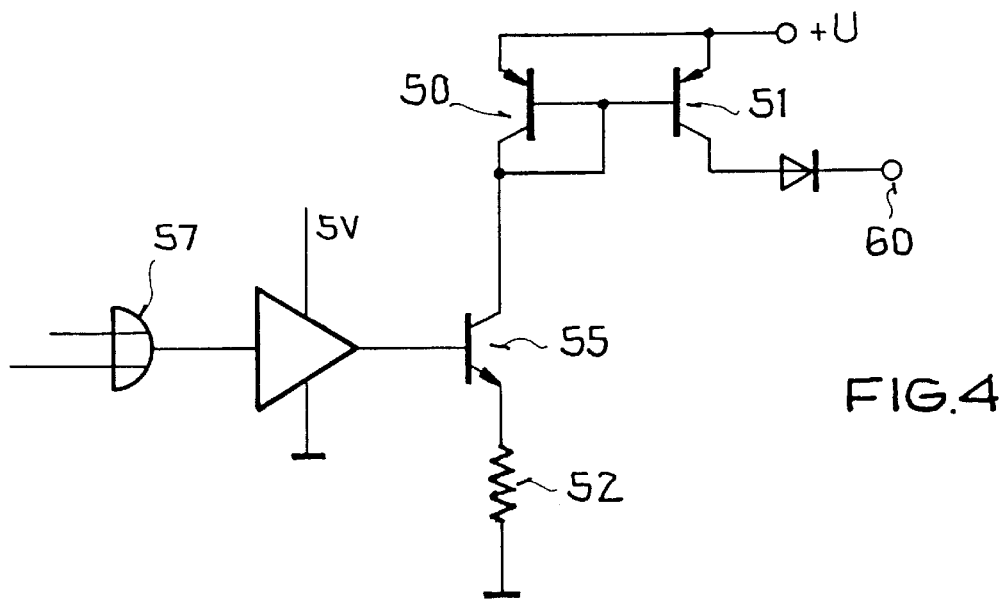
FIG. 4 is a circuit diagram of a current source

The current sources shown as a symbol in FIGS. 2 and 3 are well-known to the expert. An embodiment example of a current source is shown in FIG. 4. Reference should be made to the drawing for details. The circuit shown in FIG. 4 has two transistors 50, 51 connected in parallel on the emitter side that together have a current gain of 100. The resistor 52 is so dimensioned (14.3 kiloohm) that there is a voltage drop across it of (5–0.7) V when the current through the silicon transistor 55 is (30 mA)/100. The base of transistor 55 becomes conductive with +5 V with respect to frame when at least one control signal is supplied to an OR gate 57. The collector of the transistor 51 supplies via a diode the constant current of 30 mA to a terminal 60. When incorporating in the circuit of FIG. 2 or 3, the terminal 60 must be connected to terminal A or B, one of the inputs of the OR gate to the output of the comparator 25 (25'), and the emitters of the transistors 50, 51 must be connected to the positive terminal of the capacitor 23.

A power supply module connected in the bus can, as is apparent from the above description, forward voltage (power) to a downstream module only when the first-mentioned module is already in a stable state and possibly the load connected to it is in an operable state, and when a voltage can be built up at the output of the first-mentioned module.

In order, in those cases where a short-circuit is established, to further reduce the power loss compared with the relatively low current of 30 mA supplied from the current source, it can be advantageous to allow the current source to go over into a switched mode in which, for example, current only flows during a period of 10% of the total time (100 milliseconds current, 900 ms no current). In this way, when a short-circuit has again been removed (for instance when a short-circuit has been created during maintenance and testing for the purpose of making measurements), the normal functions of the device can then be resumed, whereas if the module concerned is in a sustained switched-off state this might possibly not be so easy to achieve.

Since the module shown in FIG. 3 includes all the parts of the central unit shown in FIG. 2 twice in a symmetrical design (except for the capacitor which is provided once only), such a module can be used to supply voltage (power) to the neighboring modules when the positive terminal of the capacitor is connected with a voltage of, for example, 12 V. In other words, such a module can be used as duplex central unit. At the same time, such a module serving as a central unit can also be connected directly to a load, or it is used only to supply voltage and is not connected to a load. The modules according to the invention make it possible within a linear or ring-shaped bus to use by alternating connection of, for example, a 12 volt supply voltage source a module in one instance as power supply module for a load and in another instance as central unit for supplying neighboring modules.

The circuit shown is suitable for supplying voltage to many more loads than shown in FIG. 1. The circuit is suitable for supplying airbag or belt-tightener output stages (which must supply the power for electronically igniting the gas generator of an airbag or a belt tightener) or other output stages for triggering other motor vehicle safety equipment.

Owing to the fact that the voltage supply in the bus system according to the invention can be operated bidirectionally and the supply line is not looped through rigidly through all loads, it is still possible to supply each module with voltage even if a single fault occurs in the cable tree.

What is claimed is:

1. Electrical power supply system, which comprises,
    a power supply line, a plurality of loads connected to the power supply line along its length, and a central unit, having an output connected to one end of the supply line supplying current to the loads; and wherein the central unit, for supplying current to the loads, and each of the loads, for supplying current to downstream loads, each have:
    a power supply unit having at least one input for a supply voltage and at least one output for the supply voltage connected to the supply line;
    a testing device connected in parallel with the respective output for testing the respective output for the supply voltage to determine whether a resistance of too low a value is connected to the respective output, indicating a short circuit at the respective output; and
    a circuit, including a switching device connected between the respective input and output of a respective power supply unit, for controlling the respective switching device to feed a supply voltage fed to a respective input of the respective power supply unit to the respective output tested by the testing device when the test establishes that there is no short-circuit.

2. An electrical power supply system in accordance with claim 1, wherein the circuit in a power supply unit switches the supply voltage through to the respective output only when the power supply unit output voltage has reached a voltage that is sufficient for operation of the respective load connected and associated with the respective power supply unit and preferably for operation of a load connected to it.

3. An electrical power supply system in accordance with claim 2, wherein the power supply unit includes a respective capacitor connected to the respective input for storing the supply voltage fed to the power supply unit.

4. Electrical power supply system in accordance with claim 3, wherein, the testing device includes a circuit for causing the current source to go to a switched mode with short current pulses and long breaks if a short circuit is detected.

5. Electrical power supply system in accordance with claim 4, wherein, the circuit of the testing device which causes the current source to go to a switched mode further causes the current source to be switched out of the switched mode if the circuit of the testing device later establishes that a short-circuit no longer exists, and the normal functions are again resumed.

6. An electrical power supply system in accordance with claim 3, wherein the testing device includes:
    a current source connected to the output terminal to which the supply voltage is to be switched through; and,
    a threshold value unit for causing the switching device, which is an electrically controllable switching device, to become conductive when, during flow of the current source of the respective testing device, the voltage at the respective output to which the supply voltage is to be switched through exceeds a predetermined threshold value.

7. An electrical power supply system in accordance with claim 6, wherein a further threshold value unit is provided in each power supply unit to activate the respective current source when the voltage at the capacitor exceeds a predetermined threshold value.

8. An electrical power supply system in accordance with claim 7, wherein:
    the central unit has a further output with a further said power supply unit connected thereto;
    each of the power supply units associated with a respective load is symmetrical with duplication of all components except for the capacitor which is provided once only, with the resulting arrangement being such that, depending on which one of the central unit outputs is supplying supply voltage, the output terminals of the central unit are operated either as the respective input on the one side and the respective output on the other side, or as the respective output on one side and as the respective input on the other side.

9. An electrical power supply system in accordance with claim 7, wherein the switching device is a semiconductor element.

10. An electrical power supply system in accordance with claim 9, wherein the semiconductor element is a transistor.

11. An electrical power supply system in accordance with claim 9, wherein the current path of the switching device is bridged by a protective diode.

* * * * *